(12) United States Patent
Gustafsson et al.

(10) Patent No.: US 8,923,411 B2
(45) Date of Patent: Dec. 30, 2014

(54) METHOD AND SYSTEM FOR DETERMINING A QUALITY VALUE OF A VIDEO STREAM

(75) Inventors: Jörgen Gustafsson, Luleå (SE); David Lindegren, Luleå (SE); Martin Pettersson, Vallentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 711 days.

(21) Appl. No.: 13/127,285

(22) PCT Filed: Nov. 4, 2008

(86) PCT No.: PCT/EP2008/064959
§ 371 (c)(1),
(2), (4) Date: May 3, 2011

(87) PCT Pub. No.: WO2010/051834
PCT Pub. Date: May 14, 2010

(65) Prior Publication Data
US 2011/0211629 A1    Sep. 1, 2011

(51) Int. Cl.
*H04N 7/12* (2006.01)
*H04N 11/02* (2006.01)
*H04N 11/04* (2006.01)
*H04N 19/89* (2014.01)
*H04N 19/154* (2014.01)
*H04N 17/00* (2006.01)
*H04N 19/46* (2014.01)
*H04N 19/159* (2014.01)

(52) U.S. Cl.
CPC ....... *H04N 17/004* (2013.01); *H04N 19/00933* (2013.01); *H04N 19/002* (2013.01); *H04N 7/26196* (2013.01); *H04N 19/00545* (2013.01); *H04N 19/00218* (2013.01)
USPC .................................................... 375/240.27

(58) Field of Classification Search
CPC ............. H04N 7/50; H04N 7/68; H04N 7/64; H04N 7/26244; H04N 21/2383
USPC ........................................ 375/240.01–240.27
See application file for complete search history.

(56) References Cited

U.S. PATENT DOCUMENTS

2004/0168110 A1* 8/2004 Fuldseth et al. ................. 714/48
2005/0195750 A1* 9/2005 Le et al. ......................... 370/252

(Continued)

FOREIGN PATENT DOCUMENTS

JP          2006/033722 A      2/2006
JP          2007019802 A       1/2007

OTHER PUBLICATIONS

Reibman, A., et al., "Predicting packet-loss visibility using scene characteristics." Packet Video 2007, IEEE, PI, Nov. 1, 2007, pp. 308-317, XP031170628.
Tao, S. et al. "Real-Time Monitoring of Video Quality in IP Networks." IEEE/ACM Transactions on Networking, vol. 16, No. 5, Oct. 2008.

(Continued)

*Primary Examiner* — Andy Rao
*Assistant Examiner* — Jared Walker
(74) *Attorney, Agent, or Firm* — Coats and Bennett, PLLC

(57) ABSTRACT

Identifying lost data packets and at least two intra coded frames of a video stream can be useful in determining the quality value of the video stream. The intra coded frames having maintained image quality can be determined based on estimating whether an intra coded frame is associated with a lost data packet. This allows a distance to be estimated between each one of the lost data packets and a next respective, subsequent intra coded frame having a maintained image quanta. Based on the distances, a quality value for the video stream can be generated.

15 Claims, 2 Drawing Sheets

(56) References Cited

U.S. PATENT DOCUMENTS

2007/0081587 A1* 4/2007 Raveendran et al. ...... 375/240.1
2008/0192119 A1* 8/2008 Li et al. ........................ 348/180
2008/0198931 A1* 8/2008 Chappalli et al. ........ 375/240.16
2008/0232469 A1* 9/2008 Nie et al. ................. 375/240.12

OTHER PUBLICATIONS

Liang, Y. J. et al. "Analysis of Packet Loss for Compressed Video: Effect of Burst Losses and Correlation Between Error Frames." IEEE Transactions on Circuits and Systems for Video Technology, vol. 18, No. 7, Jul. 2008.

* cited by examiner

METHOD AND SYSTEM FOR DETERMINING A QUALITY VALUE OF A VIDEO STREAM

TECHNICAL FIELD

The invention relates to a method, system and computer readable medium for determining a quality value of a video stream.

BACKGROUND ART

Today new radio networks have enabled more bitrate-heavy services such as streamed multimedia (video) content and mobile TV. At the same time TV over Internet Protocol (IP) has become a popular service in fixed communication networks. Along with this development there has been a growing emphasis on real-time assessment of video quality for this kind of visual communication services. The methods for video quality assessment include subjective methods and objective methods. The subjective methods typically involve human assessors, who grade or score video quality based on their subjective feelings, and use the grades or scores obtained in such a subjective way for video quality assessment. The objective methods, on the other hand, do not involve human assessors and assess the video quality only by using information obtained from the video sequences.

The objective video quality assessment methods can be further classified into full-reference methods, reduced-reference methods, and no-reference methods. Full reference models are available on the market and, for example, include Perceptual Evaluation of Video Quality by OPTICOM, Optimacy tool from Genista Corporation and products from Psytechnics Ltd and National Telecommunications and Information Administration.

Both the full-reference methods and the reduced-reference methods need reference information about the original video (i.e. the video actually transmitted from the transmitting side) to conduct the video quality assessment and thus cannot be used for real-time in-service video quality assessment. On the other hand, the no-reference methods do not require the reference information of the original video. Instead, the no-reference methods make observations only on decoded video (i.e. the video that has been received and decoded on the receiving side) and estimate the video quality using only the observed information on the decoded video.

For a no-reference video quality assessment, two major sources of video quality decline should be taken into consideration. The first one is coding and compression of video sources and the second one is data packet loss during transmission, i.e. during the streaming of the video content. Another source of video quality decline may be so called packet jitter.

In an IP network, deterioration in perceived video quality is typically caused by data packet loss. Most packet losses result from congestions in network nodes as more and more packets are dropped off by routers in IP networks when congestion occurs and the severity increases. In case of a wireless communication network, poor radio conditions may cause packet loss. The effect of packet loss is a major problem for real-time video transmission (streaming video). The measurement of the video quality decline caused by packet loss during transmission is referred to as packet loss metric.

The streamed video is typically coded and compressed by using codecs such as, for example, H.263, MPEG-4, H.264 and VC-1, that utilize temporal predictive coding to improve coding efficiency. Three types of frames are then commonly used: a) intra frames (I-frames) that do not use temporal prediction and serves as a video refresh frame, b) predictive frames (P-frames) and c) bi-predictive frames (B-frames) that are predicted from one or more reference frames. Here, I-frames and P-frames usually act as reference frames, and if a part of a reference frame is lost an error resulting from the loss tends to propagate in time until the next I-frame (or P-frame) refreshes the video.

A number of prior methods for calculating video deterioration due to packet loss have been proposed, of which one is based on estimating a number of lost macro-blocks for each frame type of a video stream. Another technique extracts spatial distortion of each image in a video stream using differences between corresponding regions of two adjacent frames in the video sequence. The spatial distortion is weighted based on temporal activities of the video, and the video quality is measured by detecting the spatial distortions of all images in the sequence.

However, the aforementioned methods for calculating video deterioration needs to process all the blocks in the image frames, which means that those methods are very computational intensive and are not optimal for use in many real time video transmissions applications.

SUMMARY

In view of the foregoing, it is an object of the invention to provide an improvement of the above techniques and prior art. More particularly, it is an object to provide a parametric (no-reference) method for estimating quality of streaming video, which method requires little computational effort.

Hence a method is provided for determining a quality value of a video stream transmitted to a media player. The method comprises the steps of, for a measuring interval of the video stream: identifying at least two lost data packets of the video stream; identifying intra coded frames of the video stream; determining which of the intra coded frames that have a maintained image quality, based on estimating if a lost data packet is associated with an intra coded frame; estimating a distance between each one of the lost data packets and a next respective, subsequent intra coded frame having a maintained image quality; and generating the quality value, based on the distances.

In further detail, the quality value is determined for a measuring interval that can be set as a parameter. For example, the measuring interval may be a time interval, or a number of sequential data packets or a number of sequential picture frames of the video stream. "Lost data packets" also includes any data packet that is not necessarily lost per se but contains information that is corrupt to such an extent that the information of the data packet may not be fully retrieved.

It should also be noted that an intra coded frame is, in this context, a frame which is used as a reference frame for other frames, which means that the video is a compressed video that comprises some picture frames that require the prior decoding of some other picture frame(s) in order to be decoded. As known within the art, data forming the picture frames are contained in data packets of the video stream.

Since data packets and frames of the video stream are sequential and since it is possible to tie a data packet to a video frame, the distance between a lost packet and an intra frame may be given by a time value, or by a number of data packets or by a number of picture frames. This is quite advantageous in that the required calculations for the distance determining are quite fast and straightforward, which means that little computational effort is required by a computer device that performs the method.

Here, a frame that has a "maintained image quality" is a frame for which no information have been lost during transport.

The generating of the quality value may comprise weighting of the distances, which is quite advantageous in that the video quality experienced by a user may not always be linear with the distance from a corrupt data packet to an intra coded frame. By using weighting, less computational effort is needed in comparison with known technologies, as weighting is a quick operation and allows for a generation of a more subjectively reliable quality value.

The weighting of a long distance of the distances may be higher than the weighting of a shorter distance of the distances, which produces a more reliable quality value as a user often registers low video quality only after some time, i.e. when the distance from the lost data packet to the intra coded frame is long.

The long distance and the shorter distance may be estimated for a common intra coded frame, which is particularly relevant since the intra coded frame refreshes the video image.

The weighting of an estimated distance of a lost data packet associated with an intra coded frame may be relatively higher than the weighting of an estimated distance of a lost data packet associated with a predicted image frame of the video stream, which gives a more reliable quality value since an error in an intra coded frame propagates to the next intra coded frame with a maintained image quality. This weighting is also useful since intra coded frames are added when there is a scene change, and a quality loss in a scene changing intra coded frame will cause the error to be very visible.

The weighting of distances of two data packets associated with a common image frame may be higher than the weighting of distances of two data packets associated with different image frames, which give a more reliable quality value since many lost data packets for the same image frame significantly reduces the subjectively experienced video quality.

The data packets may be defined by a real-time transport protocol comprising a marker bit, and an image frame of the video stream may be identified as an intra coded frame in dependence of a marker bit value of a data packet of the image frame, which provides for a computationally efficient image identification process.

An image frame of the video stream may be identified as an intra coded frame in dependence of if an image size of the image frame is a factor larger than an image size of an average image frame, which, from a computational point of view, increases the efficiency of the method.

The generating of the quality value may be based on a data packet loss rate. Typically data packet loss rate is the relation between the number of lost data packets and the total number of transmitted data packets (during the measure interval).

According to another aspect of the invention, a system is provided for determining a quality value of a video stream transmitted to a media player. The system is configured to, for a measuring interval of the video stream: identify at least two lost data packets of the video stream; identify intra coded frames of the video stream; determine which of the intra coded frames that have a maintained image quality, based on estimating if a lost data packet is associated with an intra coded frame; estimate a distance between each one of the lost data packets and a next respective, subsequent intra coded frame having a maintained image quality; and generate the quality value, based on the distances.

According to yet another aspect of the invention, a computer readable medium is provided, having stored thereon a computer program having software instructions which when run on a computer cause the computer to, for a measuring interval of a video stream, perform the steps of: identifying at least two lost data packets of the video stream; identifying intra coded frames of the video stream; determining which of the intra coded frames that have a maintained image quality, based on estimating if a lost data packet is associated with an intra coded frame; estimating a distance between each one of the lost data packets and a next respective, subsequent intra coded frame having a maintained image quality; and generating the quality value, based on the distances.

The inventive system and computer readable medium may comprise, be configured to execute and/or having stored software instructions for performing any of the features described above in association with the inventive method, and has the corresponding advantages.

BRIEF DESCRIPTION OF THE DRAWINGS

Embodiments of the invention will now be described, by way of example, with reference to the accompanying schematic drawings, in which.

DETAILED DESCRIPTION OF PREFERRED EMBODIMENTS

Figure 1:
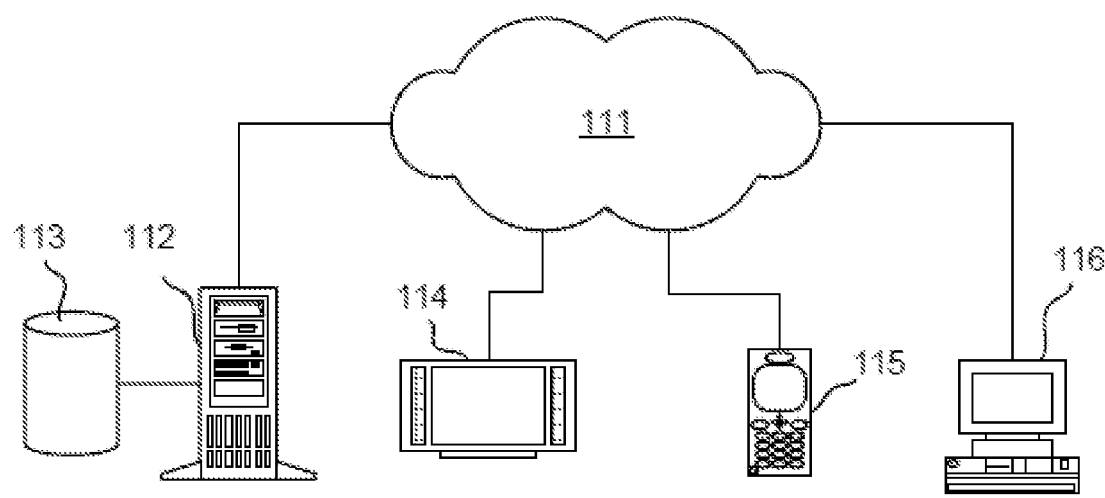
FIG. 1 illustrates a system implementing the invention.

With reference to FIG. 1 a system implementing the invention is illustrated and comprises a media (video) content server 112 that is connected to a database 113 on which media content such as compressed video is stored. The media content server 112 is, via a network 111, connected to a number of media players such as a TV 114, a mobile phone 115 and a personal computer 116 or any other electronic device capable of receiving and playing streaming video. The media content server 112 is configured to send a compressed video stream via the network 111 to the media players 114, 115, 116 which in turn are configured to receive and decode the video stream such that a video content of the stream may be played by the media players 114, 115, 116.

Sending, receiving and decoding are here done in a conventional manner and all involved devices implements a suitable, known network protocol that supports streaming video.

Figure 2:
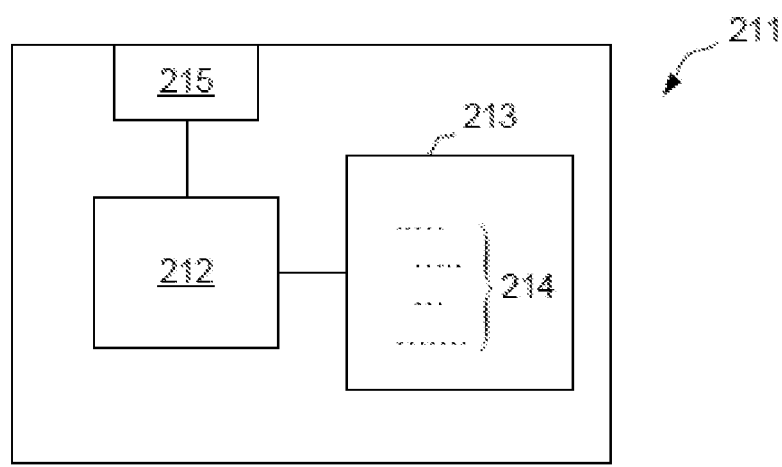
FIG. 2 is a schematic view of a media player.

In further detail, FIG. 2 illustrates a media player 211 that is connected (not shown) to the media content server 112 via the network 111. The media player 211 comprises a processor 212 which is connected to a computer readable medium 213, here in the form of a non-volatile memory such as a hard disk, ROM (Read-Only Memory) and a flash memory, having stored thereon a computer program 214. The computer program 214 comprises software instructions which when run on the media player causes the media player 211 to make the method steps described below. A communications interface 215 is also connected to the processor 212 for providing communication with the media content server 112 via the network 111.

The media player 211 also comprises means and software instructions (not shown) for receiving and decoding the video stream and subsequently play the video content of the video stream.

As mentioned, the media content server 112 and media players 114, 115, 116, 211 mutually communicate and operate in a conventional, known manner. In particular, the devices may implement the "RTP Transport Protocol for Real-Time Applications" in accordance with the Request for Comment no. 3550 (RFC 3550). Of course, it is possible to use other protocols when implementing the inventive method and system, e.g. the transport protocols MPEG2-TS and MPEG4-TS. In any case, this means that the video stream sent to the media players comprises data packets for the transportation of the data content of the video stream.

As described, the video stream transports video that is compressed by a compression codec (encode-decode scheme) such as H.263, MPEG-4, H.264 and VC-1. This means that a picture frame of the video stream is compressed using different algorithms in dependence of what compression codec is used.

As a result, the different algorithms for video frames gives different picture types or frame types of the video stream, and three major picture types are used, i.e. I-frames (Intra coded frames), P-frames (Predicted frames) and B-frames (Bi-directional predicted frames). As known within the art, I-frames are the least compressible but don't require other video frames to decode. P-frames can use data from previous frames to decompress and are more compressible than I-frames, while B-frames can use both previous and forward frames for data reference to get an even higher amount of data compression. Of course, it is sufficient to have only one type of intra coded frame (e.g. the I-frame) and one type of predicted image frame (e.g. the P-frame or the B-frame).

Figure 3:
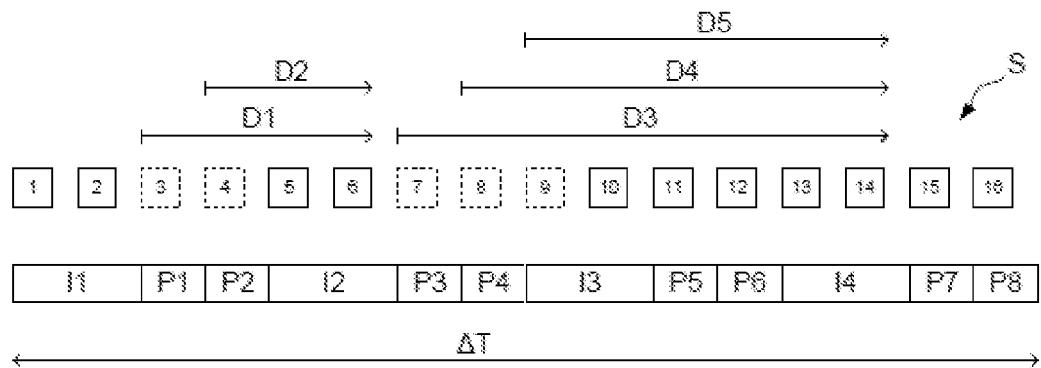
FIG. 3 is a schematic view of a video stream.

With reference to FIG. 3 a portion of the video stream S is illustrated, which portion is defined by a measuring interval ΔT of the video stream S. The measure interval ΔT is in turn defined by a start time and a stop time and the video stream S then comprises all data packets received by the media player between the start time and the stop time. It is also possible to define the measure interval ΔT by a number of subsequent data packets or by a number of subsequent picture frames of the video stream S.

In any case, the measure interval ΔT of the video stream comprises, in this example, 16 data packets 1-16. These packets 1-16 contains data in the form of 12 picture frames I1, P1, P2, I2, P3, P4, I3, P5, P6, I4, P7 and P8. Here, an intra coded frame I1, I2, I3, I4 is contained in two data packets while a predicted frame P1, P2, P3, P4, P5, P6, P7, P8 is contained in one data packet. This is due to the fact that an intra code frame typically is much larger than a predicted frame, in terms of the amount of data needed for creating the frames. The data packets 1-16 are distributed over the measure interval ΔT and since the data forming the frames are contained in the data packets the frames are also distributed over the measure interval ΔT. Data packets that are lost during the streaming process, in this example the packets 3, 4, 7, 8, 9, are illustrated with dashed lines.

Each data packet contains information about a) its sequence number i in the video stream, b) an image frame number j (derived from time stamp) the packet belongs to, and c) if the data packet is the last packet of an image frame. Typically, a so called marker bit value (M-bit value) of a data packet indicates whether the data packet is the last packet of a frame. It may also be that the marker bit value indicates whether the data packet is the first packet of a frame, depending on what transport format is used.

Accordingly, in this example, the stream sequence number of the first data packet 1 is i, the stream sequence number of the second data packet 2 is i+1 and so on. Data packets 1 and 2 each have a same image frame number j since they belong to the same image frame while data packet 3 has, or more specifically had since the packet 3 was lost, a frame number of j-1 since it belong to the next frame. Data packet 1 has an M-value of "0" indicating it is not the last packet for the frame I1, while data packet 2 has an M-value of "1" indicating it is the last data packet of the frame I1. To summarize, the data packets comprise (or should have comprised if the packet was not lost) the following information:

| Data packet | Sequence no. (SeqNo) | Image frame no. | M-bit value | Size in bytes |
|---|---|---|---|---|
| 1 | i | j | 0 | 1200 |
| 2 | i + 1 | j | 1 | 705 |
| 3 | i + 2 | j + 1 | 1 | 356 |
| 4 | i + 3 | j + 2 | 1 | 122 |
| 5 | i + 4 | j + 3 | 0 | 1200 |
| 6 | i + 5 | j + 3 | 1 | 467 |
| 7 | i + 6 | j + 4 | 1 | 502 |
| 8 | i + 7 | j + 5 | 1 | 301 |
| 9 | i + 8 | j + 6 | 0 | 1200 |
| 10 | i + 9 | j + 6 | 1 | 722 |
| 11 | i + 10 | j + 7 | 1 | 202 |
| 12 | i + 11 | j + 8 | 1 | 392 |
| 13 | i + 12 | j + 9 | 0 | 1200 |
| 14 | i + 13 | j + 9 | 1 | 456 |
| 15 | i + 14 | j + 10 | 1 | 188 |
| 16 | i + 15 | j + 11 | 1 | 376 |

In the table above illustrating data packet sizes in bytes are included, and it is possible to use these packet sizes when estimating which type of image frame a packet belongs to, since a data packet with a relatively larger packet size more likely belongs to an intra coded frame.

If the sequence of packet sequence number indicates that a packet has been lost (a sequence gap), the image frame number and the marker bit of the previous and following packets can be used to determine to which frame the lost packet belongs. In this example packet number 9 was lost, and looking at packet 8 and packet 10 both packets have the marker bit set to "1", which means that packet 8 and 10 are the last packets of their frames. The lost packet 9 thus belong to image frame number j+6 and by looking at the number of packets and the aggregated size we can estimate it to be an intra coded frame.

The image frame number j of a data packet is calculated by using the timestamp value of the data packet and by using the coded frame-rate (picture clock frequency). In more detail:

Image frame no.$_{SeqNo}$=1+(TimeStamp$_{SeqNo}$−StartTime)/frameTime, where frameTime=1/frameRate, one is added since the first frame sequence number should be 1, and StartTime is the TimeStamp of the first data packet (StartTime=TimeStamp$_1$).

In this example TimeStamp is located in the RTP header for each data packet and is the time when the packet (or rather the decoded frame that the packet belong to) should be played in the media player.

frameRate (or picture clock frequency) is the number of frames per second that the source material is sampled with, and depends on the used codec.

As the data packets are distributed over an interval, distances between data packets may be defined, typically by a difference in the data packet sequence numbers. Distances between image frames are defined by the difference between the sequence numbers of the last data packets of the image frames, while a distance between a data packet and an image frame is defined by the data packet sequence number and the sequence number of the last data packet of the image frame.

Figure 4:
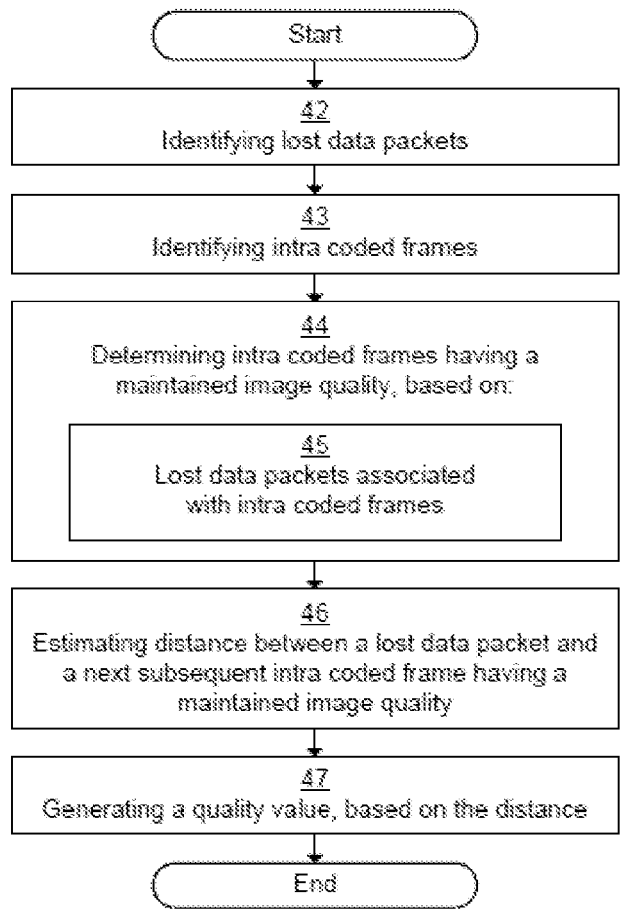
FIG. 4 is a flow diagram of an embodiment of the inventive method.

With reference to FIG. 4, the inventive method is illustrated and comprises a first step 42, which comprises identification of lost data packets 3, 4, 7, 8, 9 of the video stream S, which is done by investigating which data packet sequence numbers are missing, where a missing sequence number means a missing data packet.

Next a second step 43 is performed and comprises identification of intra coded frames I1, I2, I3, I4 of the video stream S is performed. This is done by comparing data bit-size of packets belonging to a target image frame with data-bit size of all packets belonging to image frames surrounding the target image frame. If the target image frame is more than or equal to x times larger than the mean of the surrounding frames the target frame is considered to be an intra coded image frame. A suitable value of x is for a standard H.264 baseline stream typically 2.5. For a lost data packet a mean data packet size is used.

To determine data bit-size of packets belonging to a target frame, bit-sizes of all packets with same image frame number (timestamp) belonging to the target frame are added. If a sequence number is missing a packet is lost. The total size of packets belonging to a frame then represents the image frame size.

Thereafter it is in a third step 44 determined which of the intra coded frames I1, I2, I4 that have a maintained image quality, which is done by estimating 45 if a lost data packet 9 is associated with an intra coded frame I3. In further detail, if the sequence numbers of data packets having the same image frame number are sequential, no data packet is missing and the frame has a maintained image quality.

A fourth step 46 comprises estimation of a distance D1, D2, D3, D4, D5 between a lost data packet 3, 4, 7, 8, 9 and a next subsequent intra coded frame I2, I4 having a maintained image quality is done according to the definition of distances above.

Finally, in a fifth step 47 quality value Q is generated based on the distances D1, D2, D3, D4, D5. In its most simple form the quality value Q is the sum of the distances, which in this example means that Q may be D1+D2+D3+D4+D5=3+2+7+6+5=23. This is an objective quality value which may be interpreted by a subjective evaluation done by users watching the video, such that different quality values have corresponding different perceived video quality values.

The quality value may be calculated by weighting the distances, for better reflecting the perceived video quality. One method of weighting includes weighting of a long distance D1 higher than a shorter distance D2, e.g. by using an exponential formula such as $Q=e^{D1}+e^{D2}+\ldots$. However, in practice more advanced exponential formulas may be used. For a better quality value this kind of weighting is done particularly for distances that refer to the same intra coded frame having a maintained image quality.

The weighting may also include weighting the distance D5 belonging to the intra coded frame I3 higher than the weighting of the distance D3 belonging to the predicted image frame P3, e.g. by multiplying the D5 value with a factor y prior the summarization of distances, or prior to inserting the distance values in the exponential formula.

Moreover, the quality value may also depend on the data packet loss rate which per se is determined in a manner common within the art. For example, the loss rate may then be multiplied with the sum of the distances when determining the quality value.

Although various embodiments of the invention have been described and shown, the invention is not restricted thereto, but may also be embodied in other ways within the scope of the subject-matter defined in the following claims. In particular, the invention may be implemented by using other methods for determining which data packet belongs to which image frame.

The invention claimed is:

1. A method of determining a quality value of a video stream transmitted to a media player, the method comprising, for a measuring interval of the video stream:
    identifying at least two lost data packets of the video stream;
    identifying intra coded frames of the video stream;
    determining, for each of the intra coded frames identified, that the intra coded frame has a maintained image quality if none of the lost data packets identified are associated with the intra coded frame;
    estimating, for each of the lost data packets identified, a distance between that lost data packet and the next intra coded frame that occurs subsequently to the lost data packet in the video stream and that has a maintained image quality, the distance based on a difference in data packet sequence numbers between that lost data packet and a data packet of that next intra coded frame;
    weighting the distances, for each of the lost data packets identified, wherein said weighting comprises weighting a relatively longer distance higher than weighting a relatively shorter distance, and wherein said weighting reflects that the longer the distance is, the longer an error propagates and the more impact the error has on the quality value; and
    generating the quality value, based on the weighted distances.

2. The method according to claim 1, wherein the relatively longer distance and the relatively shorter distance are estimated for a common intra coded frame.

3. The method according to claim 1, wherein said weighting comprises weighting an estimated distance of a lost data packet associated with an intra coded frame of the video stream relatively higher than weighting an estimated distance of a lost data packet associated with a predicted image frame of the video stream.

4. The method according to claim 1, wherein said weighting comprises weighting distances of two data packets associated with a common image frame higher than weighting distances of two data packets associated with different image frames.

5. The method according to claim 1, wherein the data packets are defined by a real-time transport protocol comprising a marker bit, and wherein identifying an intra coded frame of the video stream comprises identifying an image frame of the video stream as an intra coded frame based on a marker bit value of a data packet of the image frame.

6. The method according to claim 1, wherein identifying an intra coded frame of the video stream comprises identifying an image frame of the video stream as an intra coded frame based on whether or not an image size of the image frame is a factor larger than an image size of an average image frame.

7. The method according to claim 1, wherein generating the quality value is based on a data packet loss rate.

8. A system for determining a quality value of a video stream transmitted to that media player, the system configured to, for a measuring interval of the video stream:
    identify at least two lost data packets of the video stream;
    identify intra coded frames of the video stream;
    determine, for each of the intra coded frames identified, that the intra coded frame has a maintained image quality if none of the lost data packets identified are associated with the intra coded frame;
    estimate, for each of the lost data packets identified, a distance between that lost data packet and the next intra coded frame that occurs subsequently to the lost data packet in the video stream and that has a maintained image quality, the distance based on a difference in data packet sequence numbers between that lost data packet and a data packet of that next intra coded frame;

weighting the distance, for each of the lost data packets identified, wherein said weighting comprises weighting a relatively longer distance higher than weighting a relatively shorter distance, and wherein said weighting reflects that the longer the distance is, the longer an error propagates and the more impact the error has on the quality value; and generate the quality value, based on the weighted distances.

9. The system according to claim 8, wherein the relatively longer distance and the relatively shorter distance are estimated for a common intra coded frame.

10. The system according to claim 8, wherein the system is configured to weight an estimated distance of a lost data packet associated with an intra coded frame of the video stream relatively higher than weighting an estimated distance of a lost data packet associated with a predicted image frame of the video stream.

11. The system according to claim 8, wherein the system is configured to weight distances of two data packets associated with a common image frame higher than weighting distances of two data packets associated with different image frames.

12. The system according to claim 8, wherein the data packets are defined by a real-time transport protocol comprising a marker bit, and wherein the system is configured to identify an image frame of the video stream as an intra coded frame based on a marker bit value of a data packet of the image frame.

13. The system according to claim 8, wherein the system is configured to identify an image frame of the video stream as an intra coded frame based on whether or not an image size of the image frame is a factor larger than an image size of an average image frame.

14. The system according to claim 8, wherein the system is configured to generate the quality value based on a data packet loss rate.

15. A computer program product stored on a non-transitory computer readable medium and comprising a computer program having software instructions that, when run on a computer associated with a system, cause the system to determine a quality value of a video stream transmitted to the media player, the software instructions causing the system to, for a measuring interval of the video stream:

identify at least two lost data packets of the video stream;
identify intra coded frames of the video stream;
determine, for each of the intra coded frames identified, that the intra coded frame has a maintained image quality if none of the lost data packets identified are associated with the intra coded frame;
estimate, for each of the lost data packets identified, a distance between that lost data packet and the next intra coded frame that occurs subsequently to the lost data packet in the video stream and that has a maintained image quality, the distance based on a difference in data packet sequence number between that lost data packet and a data packet of that next intra coded frame;
weighting the distance, for each of the lost data packets identified, wherein said weighting comprises weighting a relatively longer distance higher than weighting a relatively shorter distance, and wherein said weighting reflects that the longer the distance is, the longer an error propagates and the more impact the error has on the quality value; and
generate the quality value, based on the weighted distances.

* * * * *

UNITED STATES PATENT AND TRADEMARK OFFICE
CERTIFICATE OF CORRECTION

PATENT NO. : 8,923,411 B2  Page 1 of 1
APPLICATION NO. : 13/127285
DATED : December 30, 2014
INVENTOR(S) : Gustafsson et al.

It is certified that error appears in the above-identified patent and that said Letters Patent is hereby corrected as shown below:

On the Title Page, in item (57), under "ABSTRACT", in Column 2, Line 9, delete "quanta." and insert -- quality. --, therefor.

In the Specification

In Column 5, Line 66, delete "j-1" and insert -- j+1 --, therefor.

Signed and Sealed this
Twenty-third Day of February, 2016

Michelle K. Lee
*Director of the United States Patent and Trademark Office*